United States Patent
Ono

(10) Patent No.: US 9,383,510 B2
(45) Date of Patent: Jul. 5, 2016

(54) BACKLIGHT UNIT AND LIQUID CRYSTAL DISPLAY DEVICE USING THE SAME

(71) Applicant: NLT Technologies, Ltd., Kanagawa (JP)

(72) Inventor: Shin-Ichirou Ono, Kanagawa (JP)

(73) Assignee: NLT TECHNOLOGIES, LTD., Kanagawa (JP)

(*) Notice: Subject to any disclaimer, the term of this patent is extended or adjusted under 35 U.S.C. 154(b) by 0 days.

(21) Appl. No.: 14/535,685

(22) Filed: Nov. 7, 2014

(65) Prior Publication Data

US 2015/0124196 A1　May 7, 2015

(30) Foreign Application Priority Data

Nov. 7, 2013　(JP) .................................. 2013-230748

(51) Int. Cl.
*F21V 8/00*　(2006.01)
*G02F 1/1333*　(2006.01)
*G02F 1/1335*　(2006.01)

(52) U.S. Cl.
CPC ............ *G02B 6/0091* (2013.01); *G02B 6/0065* (2013.01); *G02F 1/133308* (2013.01); *G02F 1/1336* (2013.01); *G02F 2001/133314* (2013.01)

(58) Field of Classification Search
CPC ... G02B 6/0065; G02B 6/0091; G02F 1/1336
USPC .................................................. 349/58, 65
See application file for complete search history.

(56) References Cited

U.S. PATENT DOCUMENTS

| | | | | |
|---|---|---|---|---|
| 2008/0026170 A1* | 1/2008 | Yamada | ................ | B29C 61/003 428/34.9 |
| 2011/0273631 A1* | 11/2011 | Hayashi | ............... | G02B 6/0091 348/790 |
| 2012/0033447 A1* | 2/2012 | Hashino | ............... | G02B 6/0086 362/612 |
| 2012/0086890 A1* | 4/2012 | Shimokawa | ...... | G02F 1/133308 349/65 |
| 2012/0133226 A1* | 5/2012 | Hori | ...................... | F16C 17/105 310/90 |
| 2012/0281151 A1* | 11/2012 | Abe | ..................... | G02B 6/0091 348/739 |

FOREIGN PATENT DOCUMENTS

| | | |
|---|---|---|
| JP | 2005-091526 | 4/2005 |
| JP | 2010-129376 | 6/2010 |
| JP | 2011-065872 | 3/2011 |
| WO | 2010082377 | 7/2010 |

OTHER PUBLICATIONS

Machine English translation of JP2010129376 to Suzuki.*

* cited by examiner

*Primary Examiner* — Anne Hines
(74) *Attorney, Agent, or Firm* — Young & Thompson

(57) ABSTRACT

The backlight unit whose luminance life can be extended without increasing the cost and the power consumption includes: a light source unit to which a light source is mounted; a light guide plate which converts light from the light source to a surface light beam and emits the beam; and supporting members provided between the light source unit and the light guide plate, wherein each of the supporting members is a member having a function of shortening the distance between the light source unit and the light guide plate by the changes generated over time.

9 Claims, 17 Drawing Sheets

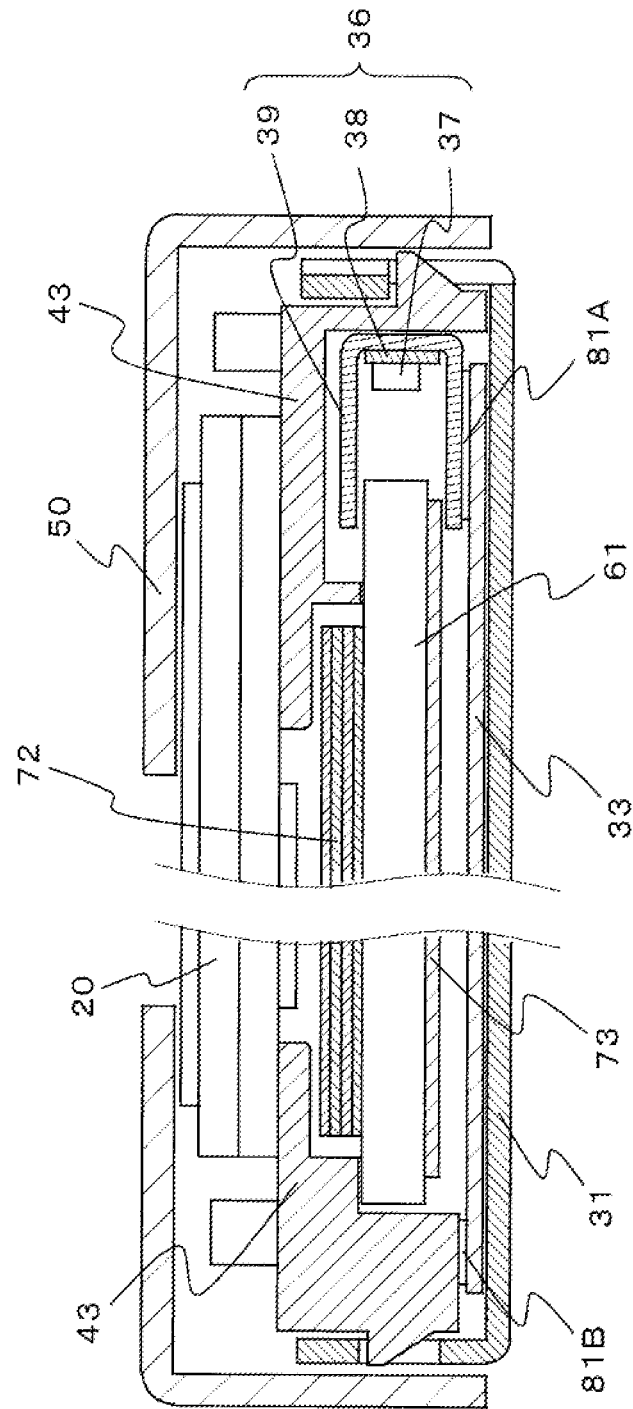

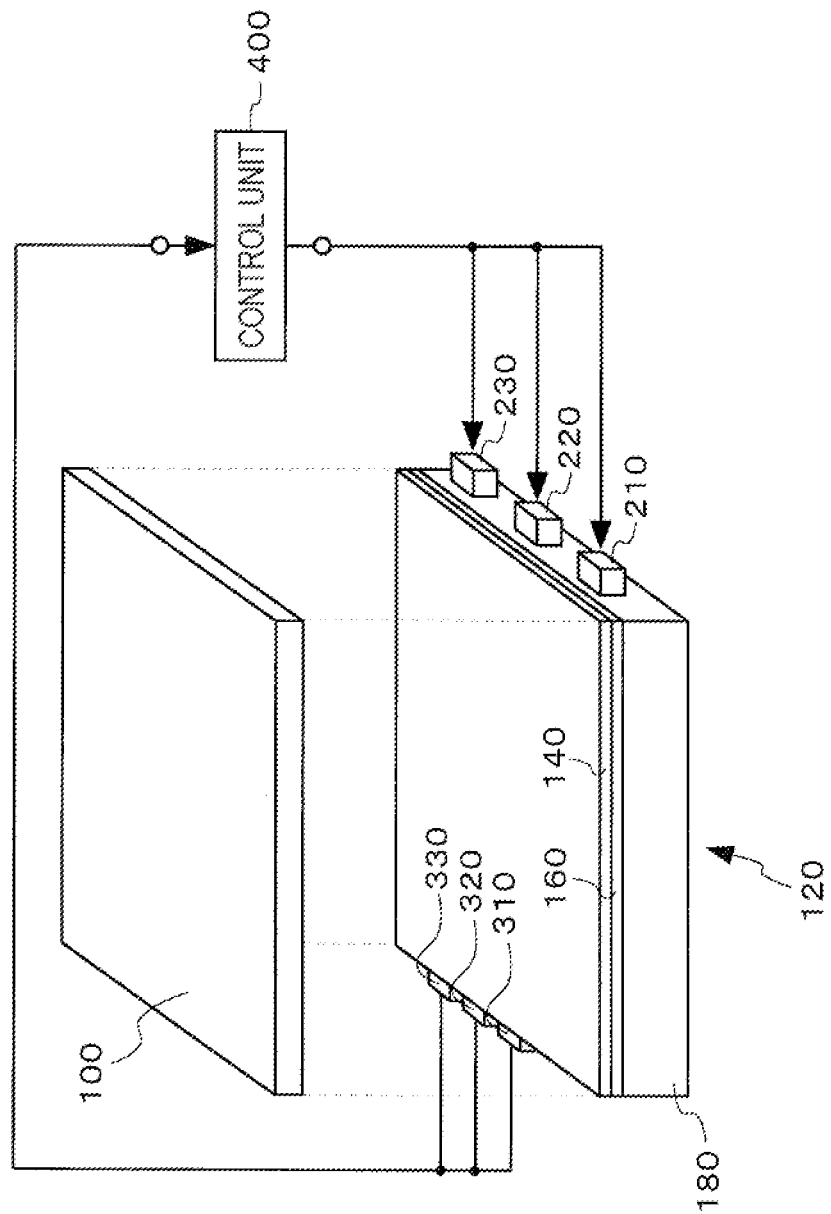

BACKLIGHT UNIT AND LIQUID CRYSTAL DISPLAY DEVICE USING THE SAME

CROSS-REFERENCE TO RELATED APPLICATION

This application is based upon and claims the benefit of priority from Japanese patent application No. 2013-230748, filed on Nov. 7, 2013, the disclosure of which is incorporated herein in its entirety by reference.

BACKGROUND OF THE INVENTION

1. Field of the Invention

The present invention relates to a device on which a backlight is mounted. More specifically, the present invention relates to a backlight unit which suppresses luminance deterioration caused due to changes over time and to a liquid crystal display device using the same.

2. Description of the Related Art

Recently, as display devices for monitors used in mobile terminals such as mobile phones, television sets, and PCs, widely used are liquid crystal display devices which exhibit advantages of being thin-type, light in weight, and low in power consumption.

The luminance of the liquid crystal display device decreases in accordance with the changes over time. In general, it is defined that the luminance life of the liquid crystal display device has run out when the luminance decreases down to 50% of the initial state. The luminance life mainly depends on the luminance life of the element (the light source element) used as the light source such as a cold cathode fluorescent lamp (CCFL) or a light emitting diode (LED) and the durability of the optical members such as the light guide plate, the optical sheet, the reflection sheet, and the like.

As a technique for preventing such changes in the luminance, there are methods for keeping the distance constant by fixing the light source and the light guide plate. Such methods are disclosed in International Patent Application Publication 2010-82377 (Patent Document 1), Japanese Unexamined Patent Publication 2011-65872 (Patent Document 2), and Japanese Unexamined Patent Publication 2010-129376 (Patent Document 3) depicted below, for example.

The lighting device in Patent Document 1 employs a structure which suppresses changes in the positional relation between the light source and the light incident surface caused due to thermal expansion or thermal shrinkage of the light guide plate in accordance with the changes in the temperature within the backlight device through employing a following mechanism which moves the LED unit by following expansion/shrinkage of the light guide plate.

Patent Document 2 discloses a lighting device which includes: a U-shaped holding member to which a light source is fixed via a light-source substrate; and a light guide body having concaves and protrusions formed partially. Concaves and protrusions are provided on the top and bottom faces of the opening part of the holding member, and those are structured to fit with the concaves and protrusions formed on the light guide body. Therefore, fluctuations in the distance between the light source and the optical conductor fixed to the holding member can be suppressed.

The liquid crystal display device disclosed in Patent Document 3 is structured in such a manner that each of the light guide plate, the reflection sheet, and a plurality of optical sheets provided to the backlight is expanded by heat individually, and the positional relation of each of the structural members is maintained by two holding members. Thus, even in a case where there are large differences in the thermal expansion coefficients of each of the members, deflection of the light guide plate and distortion of each sheet generated due to the temperature increase within the device can be prevented. Therefore, changes in the uniformity of the surface luminance of the backlight unit can be suppressed.

Further, as shown in FIG. 17, the liquid crystal display device disclosed in Japanese Unexamined Patent Publication 2005-91526 (Patent Document 4) employs a structure with which a control unit 400 which inputs signals from light receiving units 310 to 330 attached to a backlight unit 120 controls the luminance to be in a specific value through increasing the power supplied to LEDs 210 to 230 when detecting decrease in the luminance, so as to enable to extend its luminance life. In the liquid crystal display device, the luminance gradually decreases and reaches the end of the luminance life at last when the luminance decrease value caused due to deterioration of the LEDs 210 to 230 and the deterioration in the characteristics of the light guide plate 180 and the optical sheets 140, 160 which guide the light from each of those LEDs to the surfaces of the liquid crystal panel 100 exceeds the luminance increase value that can be controlled by the control unit 400.

However, even when the distance between the light source and the light guide plate is maintained uniform as in the techniques disclosed in Patent Documents 1 to 3, the light source is deteriorated, the light flux of the light source is decreased, and the luminance as the entire device becomes decreased due to the changes over time. Further, there is no technical content disclosed for preventing such issue of having deterioration of the light guide plate, the optical sheet, and the like and the luminance is decreased due to the changes over time. That is, the luminance life in the lighting devices and the like of Patent Documents 1 to 3 depends on the luminance life, of the source element and the durability of the optical members as described above. Thus, the limit of the luminance life is almost set if the members and the use conditions are same, and it cannot be extended.

Further, while the luminance life of the liquid crystal display device can be extended to some extent by employing the technical content disclosed in Patent Document 4, it is necessary to additionally provide the structural members such as the light receiving units 310 to 330 and the control unit 400. Therefore, the cost is increased. Furthermore, since the structure with which the control unit 400 increases the power supplied to the LEDs 210 to 230 for supplementing the decreased luminance is employed, the power consumption of the entire device becomes increased in accordance with changes generated over time.

The present invention is designed to improve the inconveniences of the related techniques described above. Specifically, it is an exemplary object of the present invention to provide a backlight unit which effectively extends the luminance life without increasing the cost and the power consumption and to provide a liquid crystal display device using the same.

SUMMARY OF THE INVENTION

In order to achieve the foregoing object, the backlight unit according to the present invention includes: a light source unit to which a light source is mounted; a light guide plate which converts light from the light source into a surface light beam and emits the beam; and an engagement supporting member provided between the light source unit and the light guide plate, wherein the engagement supporting member is a member which includes a function of shortening distance between the light source unit and the light guide plate by the changes generated over time.

Further, the liquid crystal display device according to the present invention includes: the backlight unit of the present invention described above; and a liquid crystal display panel which receives light from the backlight unit and outputs an image.

BRIEF DESCRIPTION OF THE DRAWINGS

FIG. 11 is a graph showing changes generated over time in the luminance maintaining rate of the liquid crystal display device caused due to shrinkage of the supporting member disclosed in FIG. 4 and the like;

FIG. 16 is a sectional view taken along a line C-C of FIG. 15; and

FIG. 17 is an explanatory chart showing the structure regarding a liquid crystal display device of a related technique.

DETAILED DESCRIPTION OF THE PREFERRED EMBODIMENTS

First Exemplary Embodiment

A first exemplary embodiment of a backlight unit and a liquid crystal display device according to the present invention will be described by referring to FIG. 1 to FIG. 13.
(Overall Structures)

Figure 2:
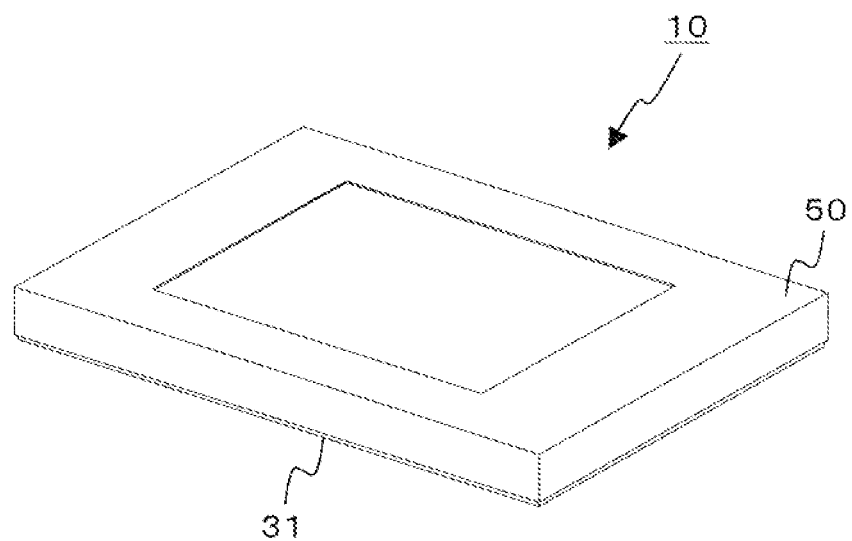
FIG. 2 is a view showing the entire external appearance of the liquid crystal display device disclosed in FIG. 1.
Figure 3:
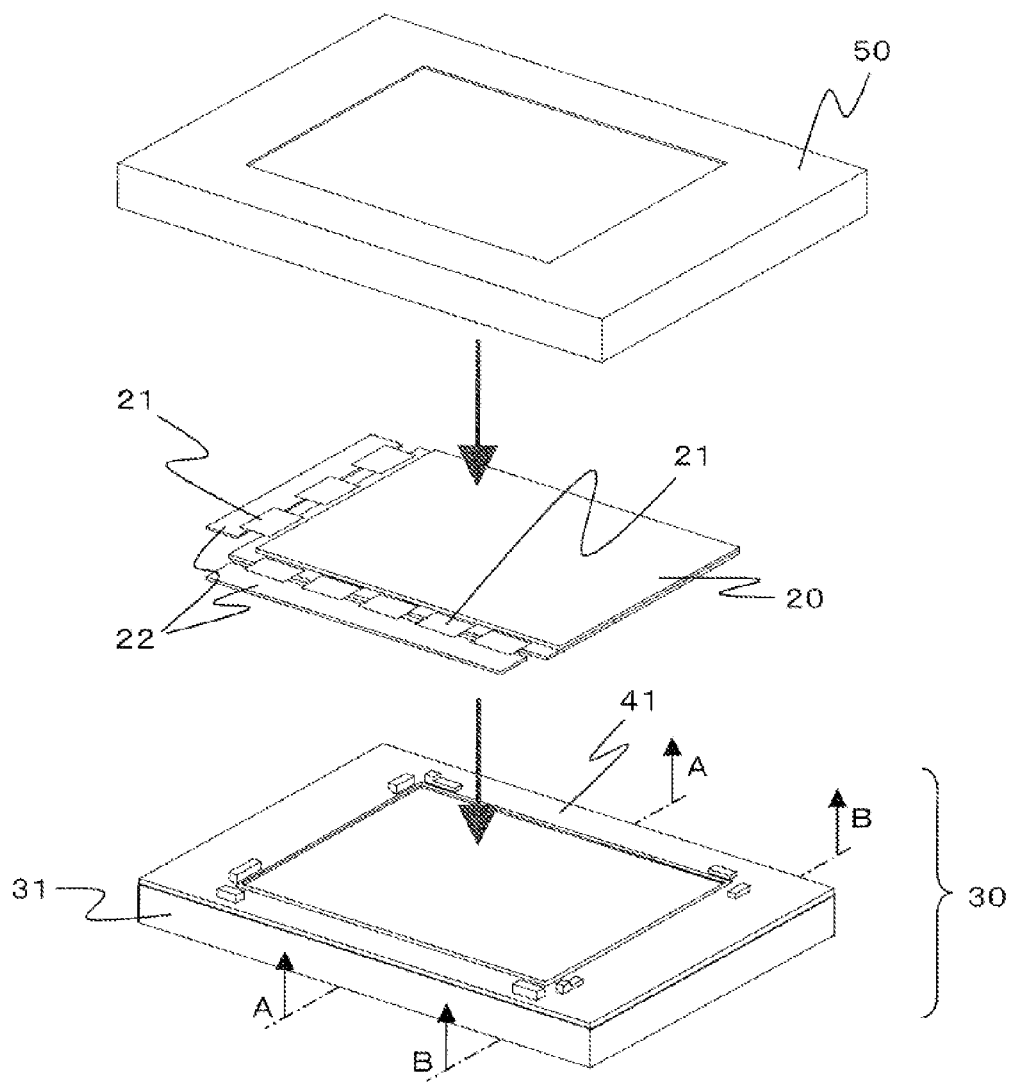
FIG. 3 is an external view showing a backlight unit, a liquid crystal display panel, and the like in particular among the inside structures of the liquid crystal display device disclosed in FIG. 2.

A liquid crystal display device 10 according to the first exemplary embodiment has an external shape shown in FIG. 2, and includes each of the structures shown in FIG. 3.

That is, in the periphery of a liquid crystal display panel 20 which outputs images, a TCP (Tape Carrier Package) 21 for driving the liquid crystal display panel 20 is mounted. An image substrate 22 for inputting image information to the TCP 21 is connected to the TCP 21.

A backlight unit 30 for irradiating light from the back face of the liquid crystal display panel 20 includes a shield rear 31 and a chassis 41, and it is formed in a structure that can be fitted into a box-shape shield front 50.

That is, in the liquid crystal display device 10 of the first exemplary embodiment, the liquid crystal display panel 20 attached to the backlight unit 30 is fixed by being sandwiched between the backlight unit 30 and the shield front 50 (see FIG. 2).

Figure 1:
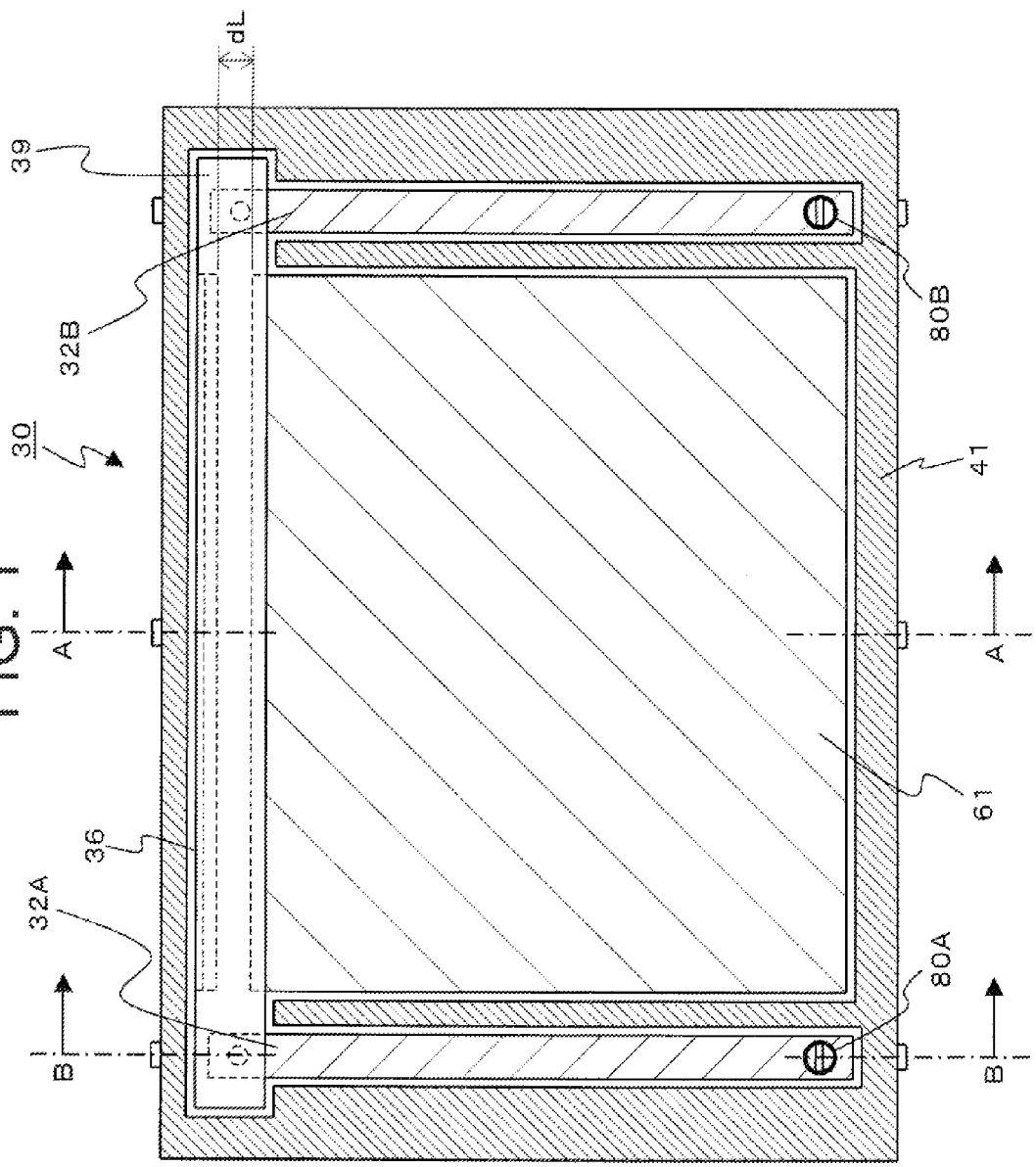
FIG. 1 is a block diagram of a liquid crystal display device according to a first exemplary embodiment of the present invention when viewed from a shield rear side (opposite side from the light emission face of a light guide plate)

Next, FIG. 1 shows a block diagram (back face block diagram) of the liquid crystal display device 10 from which the shield rear 31 and a reflection sheet (not shown) to be described later are eliminated when viewed from the shield rear 31 side (opposite side from the surface of the backlight unit 30 to which the liquid crystal display panel 20 is attached). The A-A line and the B-B line shown in FIG. 1 correspond to the A-A line and the B-B line shown in FIG. 3, and each of those lines is drawn in the same area of the liquid crystal display device 10.

As shown in FIG. 1, the backlight unit 30 includes: a light source unit 36 to which a light source (not shown) is mounted; a light guide plate 61 which converts the light from the light source into a surface light beam and emits the beam; and engagement supporting members (supporting members 32A and 32B in this case) which are provided between the light source unit 36 and the light guide plate 61.

Further, one end of the engagement supporting member is connected to the light source unit 36, and the other end is connected to the chassis 41 in which the light source unit 36, the light guide plate 61, and the engagement supporting members are stored. More specifically, the backlight unit 30 has a structure in which ends on one side of the supporting members (engagement members) 32A, 32B which support the light source unit 36 are attached, respectively, to one end (left end) and the other end (right end) of a reflector 39 which constitutes the light source unit 36.

Further, the engagement supporting member is a member which has a function of shortening the distance between the light source unit 36 and the light guide plate 61 (the relative distance of the light source unit 36 with respect to the light guide plate 61) by using the changes over time.

Figure 4:
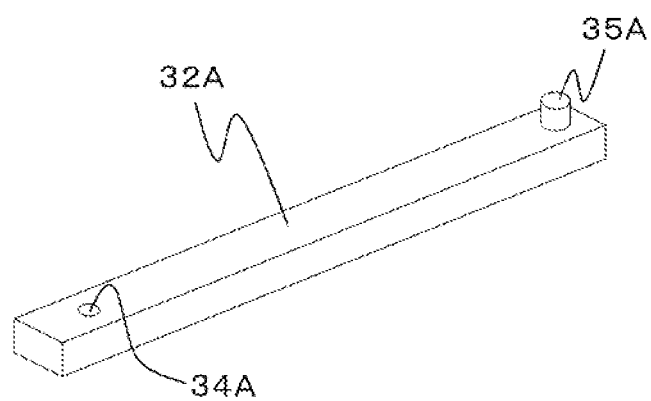
FIG. 4 is an external view showing a specific shape of a supporting member (an engagement supporting member) disclosed in FIG. 1.

Further, the shape of the supporting member 32A as the member acquired by injection-molding a crystalline resin is in lengthy shape as shown in FIG. 4, and a recessed part 34A functioning as a screw hole and a pin-shape protruded part 35A are provided to each end thereof, respectively. The supporting member 32B also has the same shape.

The recessed part 34A in the first exemplary embodiment is formed as a screw hole corresponding to a screw 80A (FIG. 1). Through screwing the screw 80A into the recessed part 34A and a screw receiving part (not shown) provided to the chassis 41 at the position corresponding thereto, the chassis 41 and the supporting member 32A are fixed. The recessed part (not shown) formed in the supporting member 32B is also the same, which functions to fix the chassis 41 and the supporting member 32B by screwing in a screw 80B (FIG. 1).

Figure 5:
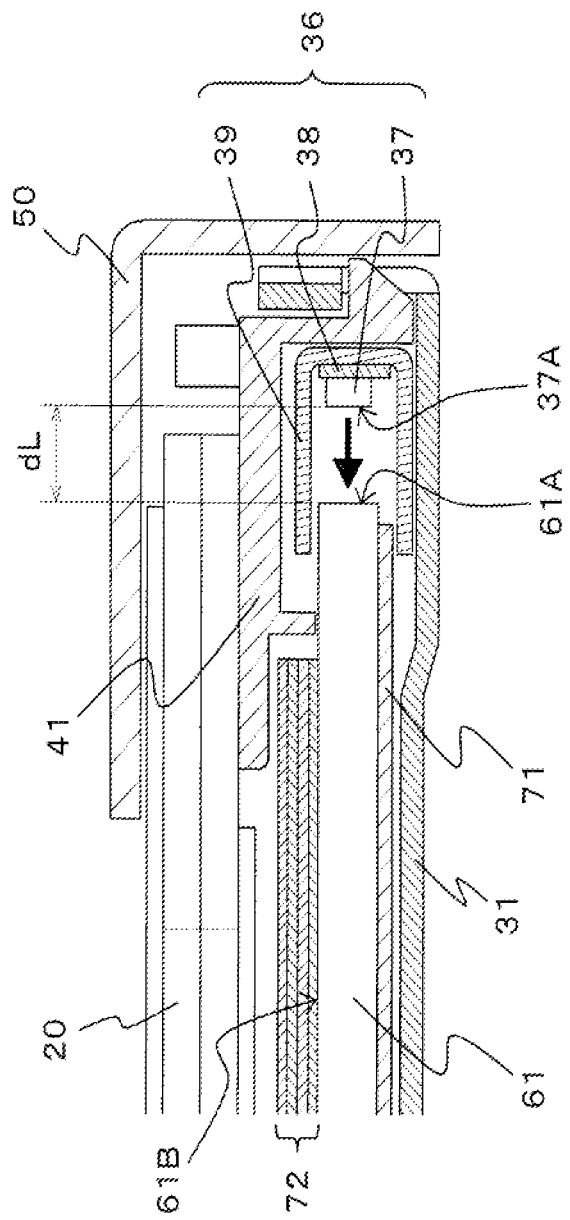
FIG. 5 is a diagram showing an initial state of the liquid crystal display device disclosed in FIG. 2 out of a sectional view taken along a line A-A of FIG. 1 and FIG. 3.

Referring now to FIG. 5 that is a sectional view taken along the line A-A (FIG. 1 and FIG. 3), the light source unit 36 includes: a light source (LED) 37 which emits light from a light emission face 37A; a light source substrate 38 to which the light source 37 is mounted; and the reflector 39 that has a U-shape sectional structure. That is, the light source substrate 38 to which the light source 37 is mounted is attached on the inner side face of the reflector 39 is mounted is attached.

Further, one end of the light guide plate 61 including a light incident face 61A is structured to be clamped in the opening part of the reflector 39, and the light emission face 37A of the light source 37 is disposed to be opposed to the light incident face 61A.

The distance between the light incident face 61A of the light guide plate 61 and the light emission face 37A of the light source 37 is shown as "dL".

When the power is supplied to the light source 37 from the light source substrate 38 to light it up, the light of the light source 37 enters the light guide plate 61 from the light incident face 61A, is reflected by a reflection sheet 71 laminated on the back face thereof, and illuminates the liquid crystal display panel 20 from the back face via an optical sheet 72 stacked on a light emission face 61B. With this, the display of the liquid crystal display panel 20 can be viewed.

Next, the structure in the vicinity of the supporting member 32A will be described by referring to FIG. 6 that is a sectional view taken along the line B-B (FIG. 1 and FIG. 3). The supporting member 32A is structured in such a manner that the protruded part (fitting pin) 35A provided to the supporting member 32A itself is fitted into a fitting hole (circular hole) 39A provided to the reflector 39, and it is coupled to the light source unit 36 (FIG. 5) thereby. The end of the supporting member 32A on the opposite side from the reflector 39 side is fixed to the chassis 41 via the screw 80A.

The structural content regarding the vicinity of the supporting member 32B is the same as the structure described above. That is, each protruded part (35A, etc.) provided on one end of each of the supporting members (32A, 32B) is fitted to each fitting hole (39A, etc.) provided at both ends of the light source unit 36, and each of the other ends of each of the supporting members (32A, 32B) is fixed to the chassis 41 via each of the screws 80A, 80B screwed into the recessed parts (34A, etc.) provided therein.

(Manufacturing Method of Each Supporting Member)

As the supporting members 32A and 32B, the first exemplary embodiment employs the ones that are injection-molded in such a manner that its size shrinks due to changes generated over time.

In general, the phenomenon of shrinking caused depending on the environmental temperature and the like after 24 hours has passed from the molding is referred to as post-shrinkage. In order to cause the post-shrinkage, the first exemplary embodiment employs a method described below when injection-molding each of the supporting members (32A, 32B).

As described above, the supporting member 32A and the supporting member 32B are the same members and molded by the same method, so that the actions regarding the manufacturing method of the supporting member 32A disclosed in FIG. 4 will be described herein by referring to FIG. 7-FIG. 9.

Figure 7:
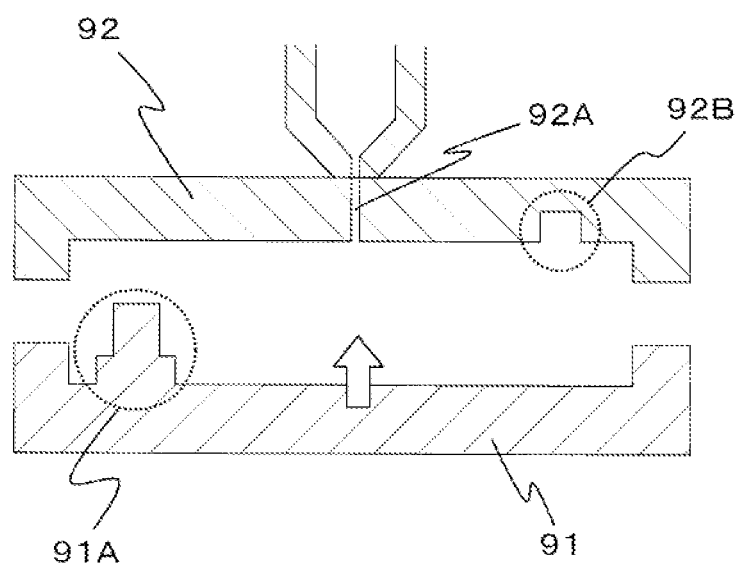
FIG. 7 is a view schematically showing a die used when injection-molding the supporting member disclosed in FIG. 4.

As shown in FIG. 7, the die used when injection-molding the supporting member 32A is constituted with two dies which are a core 91 on the movable side and a cavity 92 on the fixed side. A gate hole 92A for injecting a resin into the dies is provided on the cavity 92 side. Further, a screw hole part 91A as a protrusion for forming the recessed part (screw hole) 34A is provided to the core 91, and a pin part 92B as a pit for forming the protruded part (fitting pin) 35A is provided to the cavity 92.

Figure 8:
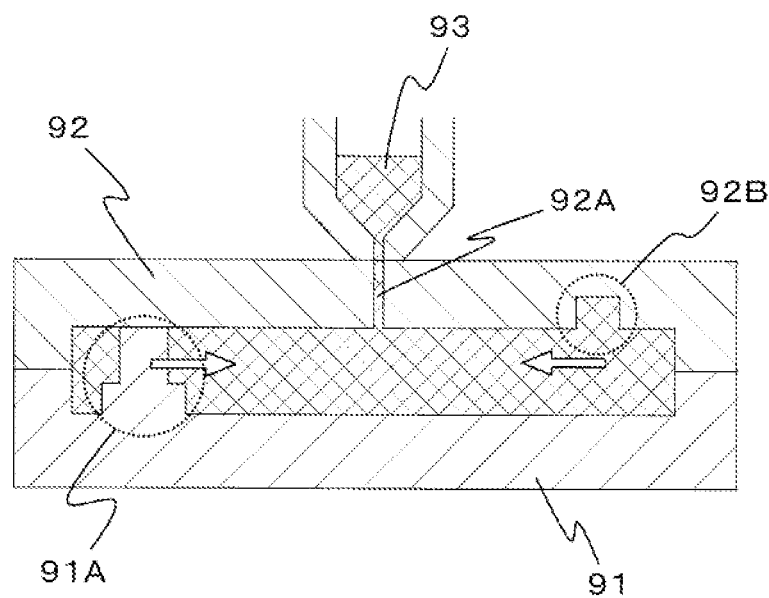
FIG. 8 is a view (injection molding view) showing a state where a die disclosed in FIG. 7 is assembled and a resin is injected.

Next, FIG. 8 shows a state where the core 91 and the cavity 92 are fitted (closed state). In FIG. 8, shown is a state where a resin 93 that is a crystalline resin is injected to a cavity formed by combining the core 91 and the cavity 92 from the gate hole 92A, which is a state along which the supporting member 32A is being molded.

In general, when performing injection-molding by using a resin, the resin fused at a high temperature is injected inside a die. Further, the injected resin starts to shrink when it is cooled and solidified.

In the first exemplary embodiment, the resin 93 fused at a high temperature is also injected into the cavity between each of the dies via the gate hole 92A and the resin 93 starts to shrink when it becomes cooled and solidified.

Note here that the supporting member 32A is in a lengthy shape and the recessed part 34A and the protruded part 35A are formed a both ends of the shape in the longitudinal direction where the shrinkage amount is great.

That is, as shown in FIG. 8, the screw hole part 91A and the pin part 92B are provided at the points corresponding to the both ends of the longitudinal direction of the supporting member 32A of the core 91 and the cavity 92. Thus, the resin 93 is caught by the screw hole part 91A and the pin part 92B as it becomes solidified (hardened), and the shrinkage thereof is obstructed. Arrows in FIG. 8 show the force along which the resin 93 is to shrink in the longitudinal direction.

As descried, when the die is cooled and the resin is solidified in a state where the shrinkage is being obstructed, a residual stress tends to remain inside the resin. Further, when a resin product molded while the residual stress is being remained inside thereof is left in a high outside temperature environment for a long time, the residual stress is released and post-shrinkage starts to occur.

In order to utilize the residual stress effectively, in the first exemplary embodiment, a compression stress is remained within the supporting member 32A through cooling the die after injecting the resin 93 inside the die.

Figure 9:
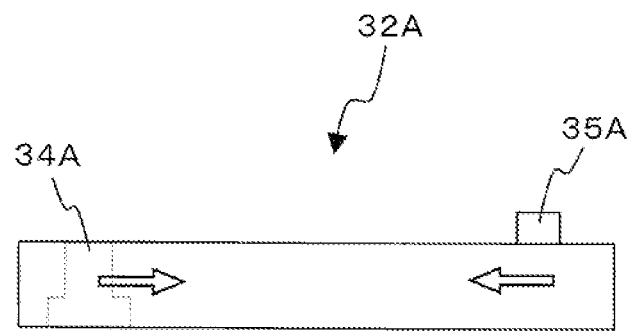
FIG. 9 is a side view of the supporting member molded by using the die disclosed in FIG. 7.

Arrows in FIG. 9 show the residual stress remained in the supporting member 32A.

When the supporting member 32A formed in the manner described above is left under a high outside temperature environment for a long time, the residual stress inside thereof is released and post-shrinkage starts to occur. Thereby, the distance between the recessed part 34A and the protruded part 35A becomes gradually shortened.

That is, as shown in FIG. 4, since the supporting member 32A is formed in a lengthy shape and the recessed part 34A and the protruded part 35A are provided at both ends, the size in the longitudinal direction thereof can be significantly shrank by the changes generated over time. As a result, the distance between the light source 37 and the light guide plate 61 can be shortened effectively.

Further, it is also possible to cool the material in a still shorter time through using a crystalline resin that easily has post-shrinkage, such as PE (polyethylene), PP (polypropylene), PA (polyamide), POM (polyacetal), PTFE (polytetrafluoroethylene), PETP (polyethylene terephthalate), or the like and setting the temperature of the die as low among the injection-molding condition.

When the fused crystalline resin starts to solidify, the molecular chains of the resin are solidified and turn to crystalline part. However, a part thereof is fixed while being remained as a non-crystalline part and solidified. That is, in a case where the proportion of the non-crystalline part is large, the molecular chains of the non-crystalline part are rearranged and crystallization is progressed when exposed to a high outside temperature environment. As a result, the volume is decreased and post-shrinkage is to occur.

Especially, a large amount of non-crystalline part is formed when the die temperature is set to be low and cooling is done abruptly. This makes it possible to cause post-shrinkage easily.

That is, with the above-described method which cools the material in a short time, the ratio of being solidified while remained in the non-crystalline part is improved. Thus, post-shrinkage tends to occur more easily. Thus, it is possible to form an engagement supporting member having a function of further shortening the relative distance of the light source 37 with respect to the light guide plate 61.

The liquid crystal display device 10, after being assembled, is used while being wrapped in a casing or the like. Thus, even when the use environmental temperature is a normal temperature, inside the liquid crystal display device 10 becomes a higher temperature than the normal temperature due to the heat generated from the own light source, the heat generated from the peripheral circuit substrates, etc., and the device 10 is used in such state in most of the cases.

Figure 6:
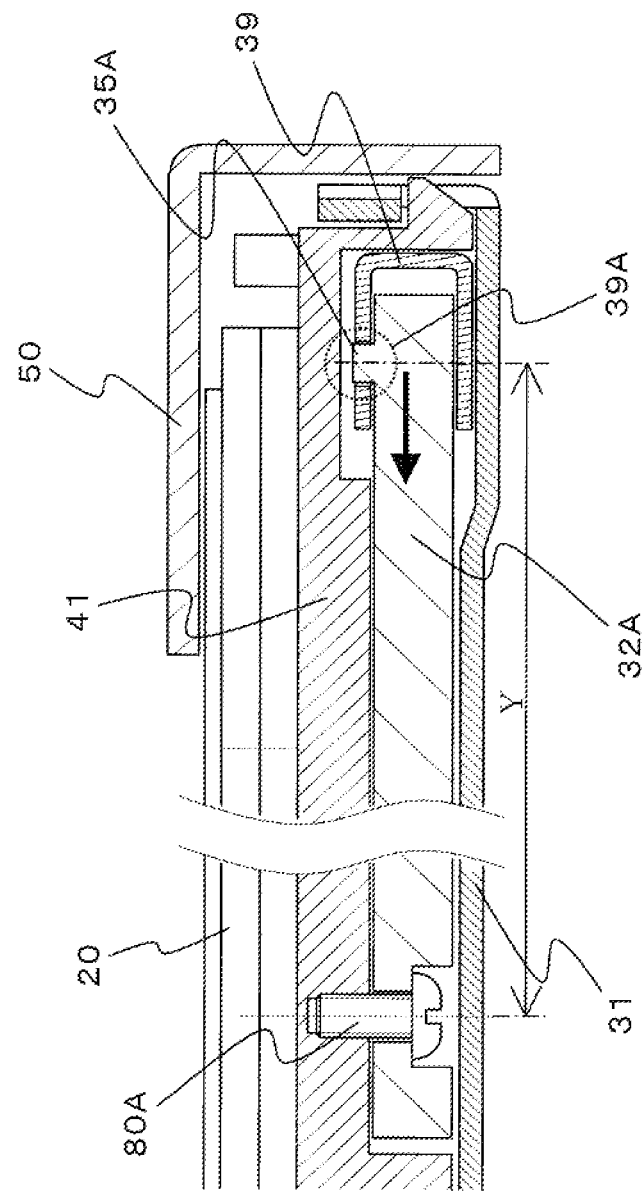
FIG. 6 is a diagram showing an initial state of the liquid crystal display device disclosed in FIG. 2 out of a sectional view taken along a line B-B of FIG. 1 and FIG. 3.

Thus, the supporting member 32A gradually starts to shrink, and the protruded part 35A starts to move to the direction of the arrow in FIG. 6 since one end (the other end) of the supporting member 32A is fixed to the chassis 41.

This is the same for the supporting member 32B. Therefore, as the protruded part 35A or the like moves, the light source 37 of the light source unit 36 attached to each of the supporting members (32A, 32B) gradually starts to move in the direction of the arrow shown in FIG. 5.

Figure 10:
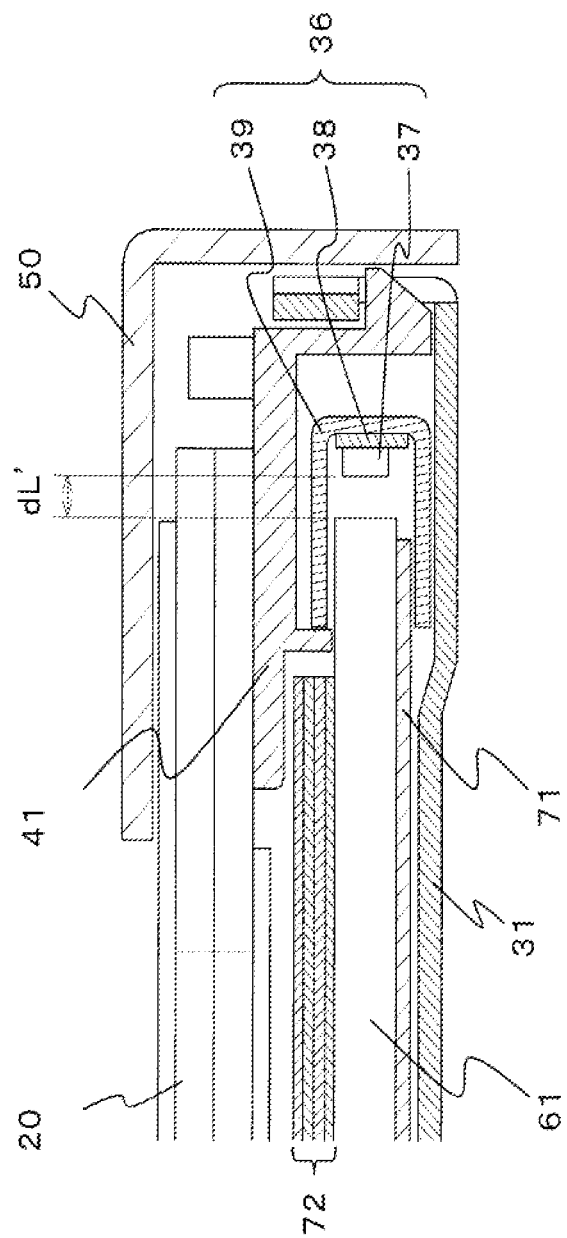
FIG. 10 shows a state where post-shrinkage of each supporting member included in the liquid crystal display device disclosed in FIG. 2 out of a sectional view taken along a line A-A of FIG. 1 and FIG. 3 has occurred.

That is, the distance between the light incident face 61A of the light guide plate 61 and the light emission face 37A of the light source 37, which is dl in the initial state (FIG. 5), is decreased gradually and becomes shortened to as shown in FIG. 10.

Thereby, the light incident efficiency to the light guide plate 61 is improved, and the luminance of the entire liquid crystal display device 10 is increased.

For example, in a case where polyacetal (POM) is employed as the material for the supporting members 32A, 32B, the length Y is shortened by about 0.5 mm by post-shrinkage when each of the supporting members (32A, 32B) is molded in such a manner that the length Y from the center of the recessed part 34A to the center of the protruded part 35A shown in FIG. 6 becomes about 20 to 25 mm under an ideal condition where post-shrinkage occurs to the most since the molding shrinkage rate of POM is 2 to 2.5%.

Therefore, when the supporting members 32A and 32B formed by employing POM as the material are attached, the length dL can be shortened from about 0.7 mm to 0.2 mm since each of the supporting members (32A, 32B) becomes shortened by 0.5 mm. Thus, the light incident efficiency to the light guide plate 61 is improved, and the luminance of the liquid crystal display device 10 can be improved up to about 1.2 times.

Figure 11:
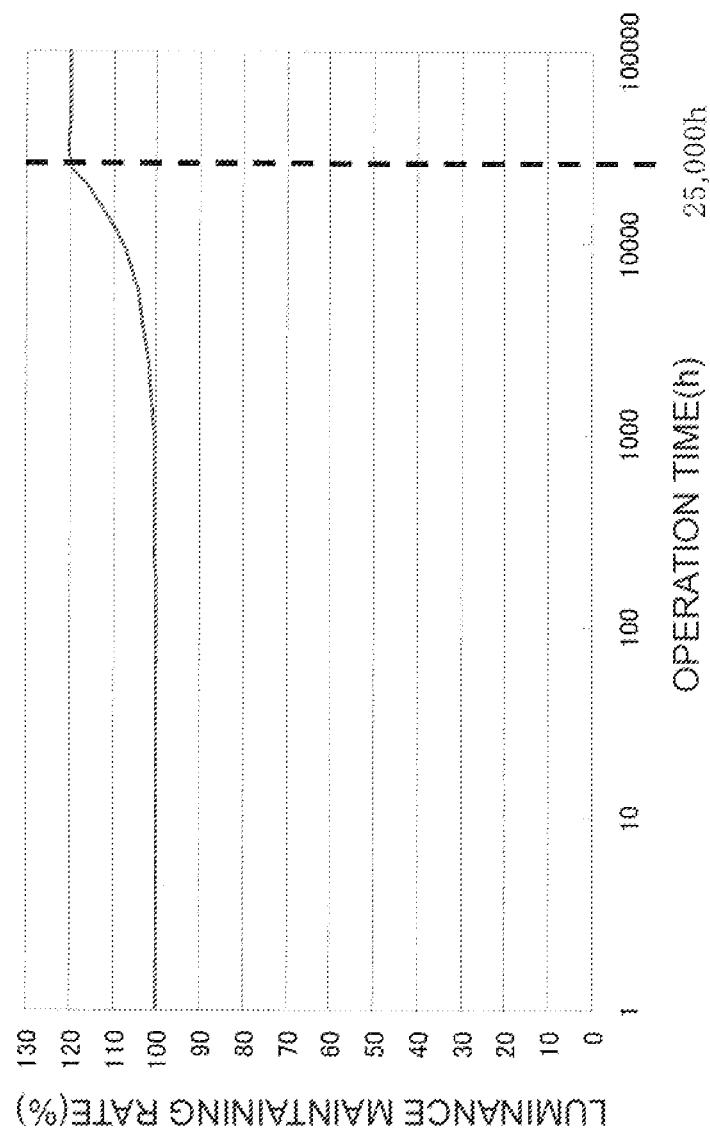

Next, FIG. 11 shows a graph of changes in the luminance of the liquid crystal display device 10 caused due to post-shrinkage of the supporting members 32A and 32B.

FIG. 11 shows changes in the luminance maintaining rate generated over time by taking the operation time (h) on the lateral axis and luminance maintaining rate (%) on the longitudinal axis. In practice, deterioration in the luminance of the light source 37 is caused by operations executed for a long time. However, only the increase in the luminance due to shrinkage of each of the supporting members (32A, 32B) is shown herein. This is also the same in FIG. 12 and FIG. 13 described below.

In the case shown in FIG. 11, the supporting members 32A and 32B gradually starts to post-shrink by the heat generated from the light source 37 and the like and post-shrinkage ends after about 25000 hours. Further, the luminance increases as the distance (dL) between the light source 37 and the light guide plate 61 becomes shorter due to the post-shrinkage, and it can be found that the luminance maintaining rate increases up to 120% before the post-shrinkage is completed.

Supposing that the post-shrinkage completed state is the state shown in FIG. 10, dL' that is the distance between the light source 37 and the light guide plate 61 does not change thereafter so that the luminance does not change either.

Figure 12:
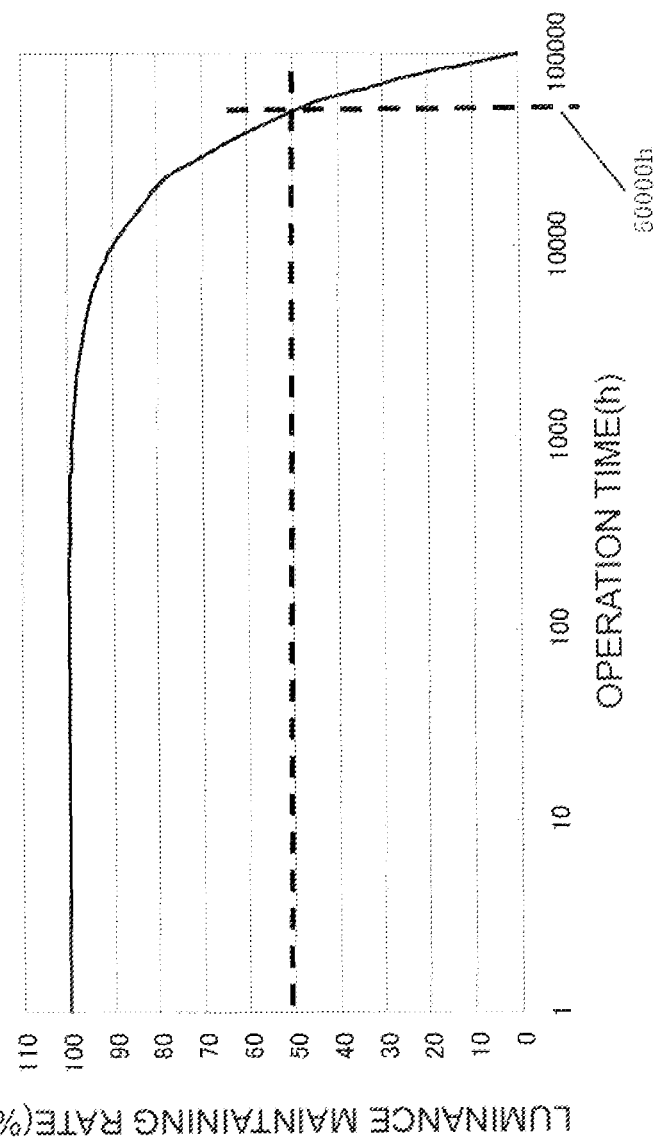
FIG. 12 is a graph showing changes generated over time in the luminance maintaining rate of a typical liquid crystal display device.

Subsequently, FIG. 12 shows a graph regarding changes generated over time in the luminance maintaining rate of a typical liquid crystal display device. When the liquid crystal display device is operated for a long period of time, the luminance is gradually deteriorated due to the deterioration in the luminance of the light source, deterioration and the like in the characteristics of the optical sheet and the reflection sheet. When the period in which the luminance is decreased from 100% as the initial luminance to 50% is defined as the luminance life of the liquid crystal display device, it can be found that the luminance life of the liquid crystal display device in this case is 50000 hours (h).

Figure 13:
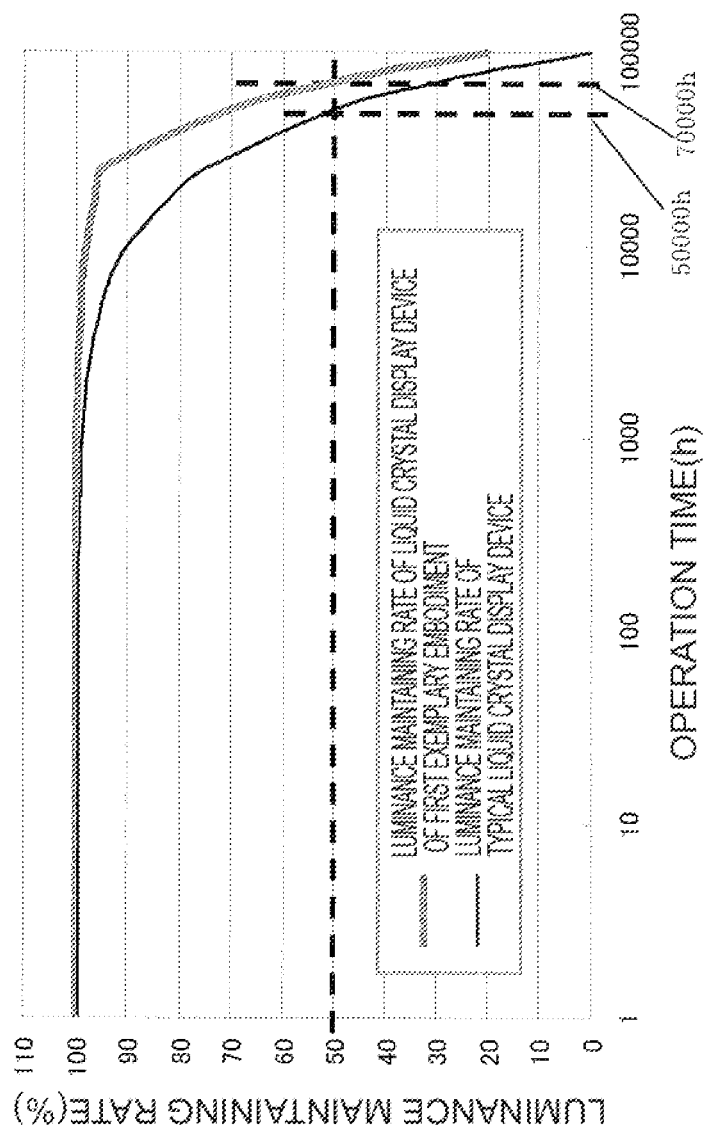
FIG. 13 is a graph showing changes generated over time in the luminance maintaining rate regarding each of the liquid crystal display device shown in FIG. 2 and the like and a typical liquid crystal display device.

Note here that the luminance value when the liquid crystal display device 10 according to the first exemplary embodiment is the sum of the luminance value in FIG. 11 and the luminance value in FIG. 12, and the graph of the luminance change is the one shown in FIG. 13.

FIG. 13 shows a relation between the luminance maintaining rate (thick line) of the case where the liquid crystal display device 10 is employed and the luminance maintaining rate (thin line) of the case where a typical liquid crystal display device shown in FIG. 12 is employed.

Comparing those, luminance increase occurs due to post-shrinkage of each of the supporting members (32A, 32B) in the case where the liquid crystal display device 10 is employed. Thus, a part of the luminance deterioration is offset and the luminance life is extended to 70000 hours (h) from 50000 hours (h), so that it can be found that the luminance life is extended up to 1.4 times.

Effects and the Like of First Exemplary Embodiment

As described above, by employing the backlight unit 30 to which the supporting members 32A and 32B molded in a state where the residual stress is being remained are mounted, the luminance life as the entire device can be extended even when the components having the same luminance life characteristic as that of the typical liquid crystal display device are used. Further, through changing the molding condition and the like, the post-shrinkage rate of the supporting members 32A, 32B and the luminance maintaining rate fluctuated according to that can be adjusted. Thus, through optimizing the molding condition and the like, the luminance maintaining rate can be improved further.

In addition, it is unnecessary to use components of high cost such as the light receiving units 310 to 330, a measuring unit (not shown), and the control unit 400 of the liquid crystal display device disclosed in Patent Document 4. It is simply required to add ejection-molded resin supporting members as the structural members of the backlight unit, so that the luminance life can be extended at low cost.

Further, the technique disclosed in Patent Document 4 employs a method which increases the power supplied to the light source when the control unit 400 increases the decreased luminance, so that the power consumption of the entire device is increased due to the changes generated over time.

However, the first exemplary embodiment employs the structure with which the decreased luminance is supplemented by mounting the supporting members molded to have the residual stress remained and utilizing the post-shrinkage thereof. Thus, there is no increase in the power consumption that may be caused due to the changes over time.

That is, the luminance decrease as the entire device caused due to the changes over time can be prevented without increasing the cost and the power consumption. As a result, the luminance life can be extended.

Further, the screw holes (34A and the like) of the supporting members (32A and the like) screwed to the chassis 41 may be formed in oval-shape holes. With this, the position of the light source 37 can be adjusted. Thus, when the luminance is deteriorated, the position of the light source 37 can be brought closer to the light guide plate 61 manually. Therefore, the life can be extended further.

In the first exemplary embodiment, the screws 80A and 80B are used for fixing each of the supporting members (32A, 32B) and the chassis 41. However, as the structure for fixing those, it is also possible to employ fitting of catches, fitting of circular holes and pins, or to employ adhesive members such as double-sided adhesive tapes.

Further, as the structure for fixing each of the supporting members (32A, 32B) and the light source unit 36, it is also possible to employ screws, fitting of catches, or adhesive members such as double-sided adhesive tapes.

That is, the first exemplary embodiment employs the structure with which the ends of the engagement supporting members are engaged with one of or both of the light source unit 36 and the light guide plate 61. This makes it possible to shorten the relative distance of the light source unit 36 with respect to the light guide plate 61 over the time.

Further, while the first exemplary embodiment employs the cylindrical fitting pin as the protruded part 35A and employs a circular hole as the fitting hole 39A corresponding hereto, any shapes with which the fitting hole 39A and the protruded part 35A correspond to each other (fitted to each other) may be employed. That is, the shapes may be selected from various structures as appropriate.

Further, while the case of using LED as the light source 37 is described, it is also possible to use CCFL, EL (electro-luminescence) or the like other than LED as the light source 37.

The present invention particularly employs the structure which significantly supplements the luminance decrease of the light source caused due to changes over time. Therefore, as an exemplary advantage according to the invention, it is possible to provide the backlight unit which effectively extends the luminance life without increasing the cost and the power consumption and to provide the liquid crystal display device using the same.

Second Exemplary Embodiment

A second exemplary embodiment of the backlight unit and the liquid crystal display device according to the present invention will be described by referring to FIG. 14. Same reference numerals are used for the structural members equivalent to those of the first exemplary embodiment described above and, specifically, the points different from the case of the first exemplary embodiment are to described herein.

(Overall Structures)

Figure 14:
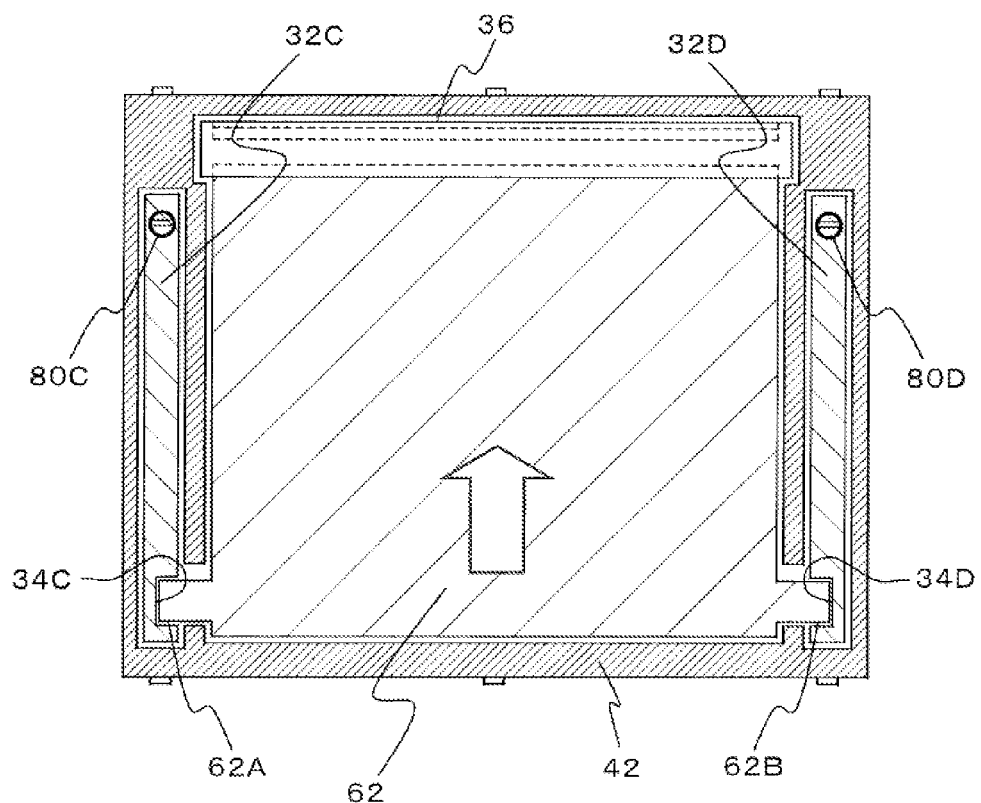
FIG. 14 is a block diagram of a liquid crystal display device according to a second exemplary embodiment of the present invention when viewed from a shield rear side (opposite side from the light emission face of the light guide plate)

FIG. 14 shows a back-face block diagram regarding the liquid crystal display device (not shown) of the second exemplary embodiment. As in FIG. 1, the shield rear and the reflection sheet are eliminated from the diagram.

As shown in FIG. 14, one end of each of the engagement supporting members (supporting members 32C and 32D herein) is connected to a chassis 42, and the other end thereof is connected to a light guide plate 62.

More specifically, a recessed part (screw hole: not shown) is provided to one end (end on the light source side) of each of the supporting members (engagement members) 32C, 32D. On the other end, engagement ports 34C, 34D are provided to the side faces thereof on the light guide plate 62 side.

Further, protrusions 62A, 62B are provided to the light guide plate 62 at the left and right ends, respectively, in the vicinity of the side face on the opposite side from the light source unit 36. Those protrusions are formed to be fitted into the engagement ports 34C and 34D, respectively.

As described, the light guide plate 62 is supported by having the protrusions 62A, 62B engaged with the engagement ports 34C, 34D, respectively, i.e., through attaching the supporting members (light guide plate supporting members) 32C, 32D to the left and right ends of the light plate 62 for supporting it.

Through screwing screws 80C and 80D into the recessed parts (screw holes) provided at ends of each of the supporting members on the light source side and screw receiving parts (not shown) provided to the chassis 42 at the positions corresponding thereto, each of the supporting members (32C, 32D) and the chassis 42 are fixed.

As in the case of the first exemplary embodiment described above, the supporting members 32C and 32D are members acquired by injection-molding a crystalline resin. That is, the supporting members 32C and 32D injection-molded to have a structure where the recessed parts (screw holes) and the engagement ports 34C, 34D are provided include a part for suppressing shrinkage (a part to be a catch) when the resin becomes solidified, at both ends thereof. Thus, shrinkage is obstructed, and a significant residual stress is remained inside.

Other structural contents are the same as the structural members of the first exemplary embodiment described above.

Through employing the structures described above, in accordance with the post-shrinkage of the supporting members 32C and 32D which are injection-molded in the same manner as that of the first exemplary embodiment and solidified in the state where the residual stress is being remained, the light guide plate 62 moves to the direction of arrow shown in FIG. 14.

That is, the second exemplary embodiment employs the structure with which the distance between the light guide plate 62 and the light source (not shown) inside the light source unit 36 becomes shortened in accordance with fluctuation in the position of the light guide plate due to the changes generated over time, so that the luminance as the entire liquid crystal display device can be increased gradually. As a result, the luminance life can be extended.

Effects and the Like of Second Exemplary Embodiment

Since the light guide plate and the supporting members for supporting it are formed in the above-described shapes and the distance between the light guide plate and the light source is structured to become shortened in association with the shrinkage of the supporting members, it is possible also with the second exemplary embodiment to prevent luminance deterioration as the entire display device due to the changes generated over time and to extend the luminance life thereby without increasing the cost and the power consumption.

Further, as in the case of the first exemplary embodiment, the screw hole of each supporting member may be formed in an oval shape. With this, even under a luminance deteriorated state or the like, the distance between the light source and the light guide plate 62 can be adjusted manually. Therefore, the life can be extended further.

While a case of using screws for fixing each supporting member and the chassis 42 is shown herein, it is also possible to employ a structure with which those are fixed by fitting of catches, fitting of circular holes and pins, or by using an adhesive member such as a double-sided adhesive tape instead. Further, for fixing each supporting member and the light guide plate 62, employed here is the structure with which those are attached by engaging the protrusions 62A, 62B of the light guide plate 62 and the recessed parts of the supporting members 32C. 32D. However, it is also possible to employ a structure with which those are fixed by screws, fitting of catches, or by using an adhesive member such as a double-sided adhesive tape instead.

Further, while the second exemplary embodiment employs the structure with which the ends of the supporting members 32C and 32D on the light source side are fixed to the chassis 42, it is also possible to employ the structure with which those are fixed to the reflector (not shown) or the like of the light source unit 36 as in the case of the first exemplary embodiment described above. With this, the distance between the light guide plate and the light source is also shortened as the supporting members shrink, so that the same effects as those described above can be acquired.

Other effects and the like are the same as those of the first exemplary embodiment described above.

Third Exemplary Embodiment

A third exemplary embodiment of the backlight unit and the liquid crystal display device according to the present invention will be described by referring to FIG. 15 and FIG. 16. Same reference numerals are used for the structural members equivalent to those of the first and second exemplary embodiments described above and, specifically, the points different from the case of the first exemplary embodiment are to be described herein.

(Overall Structures)

Figure 15:
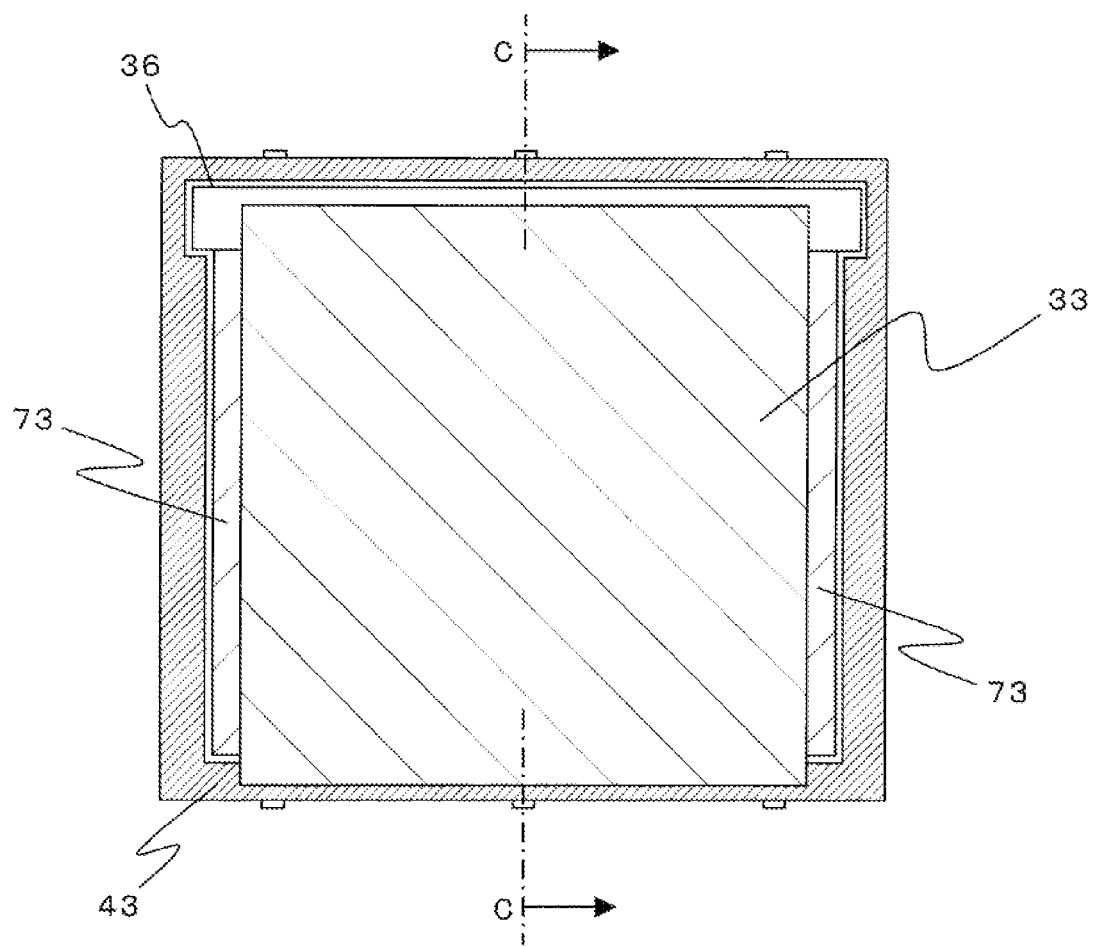
FIG. 15 is a block diagram of a liquid crystal display device according to a third exemplary embodiment of the present invention when viewed from a shield rear side (opposite side from the light emission face of the light guide plate)

First, FIG. 15 shows a back-face block diagram regarding the liquid crystal display device (not shown) of the third exemplary embodiment from which the shield rear is eliminated.

As shown in FIG. 15, it is a feature of the third exemplary embodiment that a supporting member (engagement member) 33 that is in a thin sheet form is used as an engagement supporting member for supporting the light source unit 36.

One end (the end on the light source side) in a face of the supporting member 33 opposing to a reflection sheet 73 is fixed (connected) to the light source unit 36, and the other end is fixed (connected) to a chassis 43 which stores the light source unit 36, the light guide plate (not shown), and the like.

More specifically, as shown in FIG. 16 that is a sectional view taken along a line C-C of FIG. 15, one end of the supporting member 33 is attached to the reflector 39 of the light source unit 36 by a double-sided adhesive tape 81A, and the other end is attached to the chassis 43 by a double-sided adhesive tape 81B.

The supporting member 33 is formed by stretching a resin sheet of PET or the like by applying heat and cooling the sheet that is being centrifuged.

That is, when the sheet is cooled while being stretched, a residual stress to shrink remains inside the supporting member 33. Thus, when the outside temperature increases, the supporting member post-shrinks like the supporting members (32A to 32D) of the first and second exemplary embodiments described above.

The supporting member 33 that is in a thin sheet form shrinks according to the stretched direction. Thus, it is attached by setting the direction in such a manner that the distance between the light source 37 and the light guide plate 61 becomes shortened by the post-shrinkage.

In the third exemplary embodiment, the case where the supporting member 33 is fixed to the chassis 43 is described as a way of example. However, the supporting member 33 may also be fixed to the structural member other than the chassis 43, as long as it is the structure with which the distance between the light source 37 and the light guide plate 61 is shortened when the supporting member 33 shrinks due to the changes generated over time.

As the light source 37, it is also possible to employ CCFL, EL, or the like instead of the LED. Other structural contents are same as those of the first and second exemplary embodiments described above.

Effects and the Like of Third Exemplary Embodiment

The third exemplary embodiment employs the structure with which the position of the light source 37 is fluctuated du to post-shrinkage of the supporting member 33. Thereby, the light guide plate 61 and the light source 37 become closer due to the changes generated over time, so that the luminance of the liquid crystal display device can be increased gradually.

Further, the supporting member 33 is in a thin sheet form, so that the area of the peripheral part of the screen of the liquid crystal display device can be made smaller. Thus, there is an advantage of making it possible to reduce the size of the liquid crystal display device.

Further, while the supporting member 33 herein is formed in such a manner that one end thereof is connected to the light source 37 and the other end is connected to the chassis 43, it is also possible to connect the other end to the end of the light guide plate 61 on the opposite side from the light source unit 36. With such structure, the same effects can be acquired as well. In addition, it is also possible to employ a structure with which one end of the supporting member 33 is connected to a part of the chassis 43 on the light source unit 36 side and the other end is connected to the end of the light guide plate 61 on the opposite side from the light source unit 36.

Further, instead of the sheet-type supporting member 33, a plate-type resin member formed by being stretched in the direction in parallel to the light incident direction to the light guide plate 61 from the light source 37 may be employed as an engagement supporting member to be provided between the light source unit 36 and the light guide plate 61, and the end thereof may be connected to one of or both of the light source unit 36 and the light guide plate 61. Other effects and the like are the same as those of the first and second exemplary embodiments described above.

Each of the above-described exemplary embodiments is the preferable specific example of the backlight unit d the liquid crystal display device, and there may be various kinds of technically preferable limits set thereto. However, the technical scope of the present invention is not limited to those modes unless there is a specific remark mentioned for limiting the present invention. Any other known structures can be employed as long as the effects of the present invention can be achieved therewith New technical contents of the above-described exemplary embodiments are summarized as follows. Note, however, the present invention is not necessarily limited to those.

(Supplementary Note 1)

A backlight unit which includes:

a light source unit to which a light source is mounted;

a light guide plate which converts light from the light source into a surface light beam and emits the beam; and an engagement supporting member provided between the light source unit and the light guide plate, wherein the engagement supporting member is a member which includes a function of shortening distance between the light source unit and the light guide plate by the changes generated over time.

(Supplementary Note 2)

The backlight unit as depicted in Supplementary Note 1, which includes a chassis which stores the light source unit, the light guide plate, and the engagement supporting member, wherein one end of the engagement supporting member is connected to the light source unit, and other end thereof is connected to the chassis.

(Supplementary Note 3)

The backlight unit as depicted in Supplementary Note 1, which is a chassis which stores the light source unit, the light guide plate, and the engagement supporting member, wherein one end of the engagement supporting member is connected to the chassis, and other end thereof is connected to the light guide plate.

(Supplementary Note 4)

The backlight unit as depicted in Supplementary Note 1, wherein one end of the engagement supporting member is connected to the light source unit, and other end thereof is connected to the light guide plate.

(Supplementary Note 5)

The backlight unit as depicted in any one of Supplementary Notes 1 to 4, wherein the engagement supporting member is a plate-type resin member formed by being stretched in a direction in parallel to an incident direction of light from the light source to the light guide plate.

(Supplementary Note 6)

The backlight unit as depicted in Supplementary Note 1, wherein the engagement supporting member includes a recessed part or a protruded part at each of both ends.

(Supplementary Note 7)

The backlight unit as depicted in any one of Supplementary Notes 1 to 4, wherein the engagement supporting member is a sheet-type member formed by cooling a resin sheet that is stretched by applying heat in a direction in parallel to an incident direction of light from the light source to the light guide plate.

(Supplementary Note 8)

The backlight unit as depicted in any one of Supplementary Notes 1 to 6, wherein the engagement supporting member is a member formed by injection-molding a crystalline resin.

(Supplementary Note 9)

The backlight unit depicted in Supplementary Note 2, wherein:

the engagement supporting member is constituted with a first engagement member provided on one side and a second engagement member provided on the other side by having the light guide plate interposed therebetween; and each of the engagement members is a member that is injection-molded to be in a lengthy shape with a protruded part and a recessed part formed respectively on the one end and the other end, which is disposed at a right angle with respect to the light emission face of the light source unit.

(Supplementary Note 10)

The backlight unit depicted in Supplementary Note 9, wherein:

the protruded part and the recessed part of each of the engagement members are a pin and a screw hole, respectively;

the light source unit includes a pin hole at a position corresponding to the pin;

the chassis includes a screw receiving part at a position corresponding to the screw hole; the pin is fitted to the pin hole; and the screw hole and the screw receiving part are fixed via a screw provided in advance.

(Supplementary Note 11)

The backlight unit depicted in Supplementary Note 3, wherein:

the engagement supporting member is constituted with a first engagement member provided on one side and a second engagement member provided on the other side by having the light guide plate interposed therebetween; and each of the engagement members is a member that is injection-molded to be in a lengthy shape with a recessed part and an engagement port formed respectively on the one end and the other end, which is disposed at a right angle with respect to the light emission face of the light source unit.

(Supplementary Note 12)

The backlight unit depicted in Supplementary Note 1, wherein:

the recessed part of each of the engagement members is a screw hole;

the chassis includes a screw receiving part at a position corresponding to the screw hole;

the light guide plate includes a protrusion at a position corresponding to the engagement port;

the screw hole and the screw receiving part are fixed via a screw provided in advance; and the protrusion is fitted to the engagement port.

(Supplementary Note 13)

The backlight unit depicted in Supplementary Note 4, wherein:

the engagement supporting member is constituted with a first engagement member provided on one side and a second engagement member provided on the other side by having the light guide plate interposed the between; and each of the engagement members is a member that is injection-molded to be in a lengthy shape with a protruded part and an engagement port formed respectively on the one end and the other end, which is disposed at a right angle with respect to the light emission face of the light source unit.

(Supplementary Note 14)

The backlight unit depicted in Supplementary Note 13, wherein:

the protruded part of each of the engagement members is a pin;

the light source unit includes a pin hole at a position corresponding to the pin;

the light guide plate includes a protrusion at a position corresponding to the engagement port;

the pin is fitted to the pin hole; and the protrusion is fitted to the engagement port.

(Supplementary Note 15)

A liquid crystal display device which includes:

the backlight unit as depicted in any one of Supplementary Notes 1 to 14; and a liquid crystal display panel which receives light from the backlight unit and outputs an image.

INDUSTRIAL APPLICABILITY

The present invention can be applied, to a backlight unit using LED, CCFL, EL or the like as the light source or to a liquid crystal display device and the like using the same.

What is claimed is:

1. A backlight unit, comprising:
   a light source unit to which a light source is mounted;
   a light guide plate located a distance from the light source unit, the light guide plate converting light from the light source into a surface light beam and emits the beam; and
   an engagement supporting member provided between the light source unit and the light guide plate, the engagement supporting member being configured to shrink from aging and shorten the distance between the light source unit and the light guide plate.

2. The backlight unit as claimed in claim 1, further comprising a chassis which stores the light source unit, the light guide plate, and the engagement supporting member,
   wherein one end of the engagement supporting member is connected to the light source unit, and another end of the engagement supporting member is connected to the chassis, and
   the chassis stores the one end of the engagement supporting member and the light source unit due to movement of the one end of the engagement supporting member and the light source unit toward the light guide plate.

3. The backlight unit as claimed in claim 1, further comprising a chassis which stores the light source unit, the light guide plate, and the engagement supporting member,
   wherein one end of the engagement supporting member is connected to the chassis, and another end of the engagement supporting member is connected to the light guide plate, and
   the chassis stores the other end of the engagement supporting member and the light guide plate due to movement of the other end of the engagement supporting member and the light guide plate toward the light source unit.

4. The backlight unit as claimed in claim 1, wherein one end of the engagement supporting member is connected to the light source unit, and the other end of the engagement supporting member is connected to the light guide plate, and
   one of the light guide plate and the light source unit is configured to move toward the other of the light guide plate and the light source unit.

5. The backlight unit as claimed in claim 1, wherein the engagement supporting member is a plate-type resin member formed by being stretched in a direction in parallel to an incident direction of light from the light source to the light guide plate.

6. The backlight unit as claimed in claim 1, wherein the engagement supporting member is a sheet-type member formed by cooling a resin sheet that is stretched by applying heat in a direction in parallel to an incident direction of light from the light source to the light guide plate.

7. The backlight unit as claimed in claim 1, wherein the engagement supporting member is a member formed by injection-molding a crystalline resin.

8. The backlight unit as claimed in claim 1, wherein the engagement supporting member includes a recessed part or a protruded part at each of both ends.

9. A liquid crystal display device, comprising:
   the backlight unit as claimed in claim 1; and
   a liquid crystal display panel which receives light from the backlight unit and outputs an image.

* * * * *